(12) United States Patent
Naka et al.

(10) Patent No.: US 10,241,380 B2
(45) Date of Patent: Mar. 26, 2019

(54) TERAHERTZ WAVE GENERATOR

(71) Applicant: SHIBUYA CORPORATION, Kanazawa-shi, Ishikawa (JP)

(72) Inventors: Toshiaki Naka, Kanazawa (JP); Motoi Sasaki, Kanazawa (JP); Akito Tsuchiya, Kanazawa (JP)

(73) Assignee: SHIBUYA CORPORATION, Kanazawa-shi, Ishikawa (JP)

( * ) Notice: Subject to any disclaimer, the term of this patent is extended or adjusted under 35 U.S.C. 154(b) by 0 days.

(21) Appl. No.: 15/801,869

(22) Filed: Nov. 2, 2017

(65) Prior Publication Data

US 2018/0143510 A1    May 24, 2018

(30) Foreign Application Priority Data

Nov. 11, 2016   (JP) .................................. 2016-220604

(51) Int. Cl.
*G02F 1/35*    (2006.01)
*G02F 1/39*    (2006.01)

(52) U.S. Cl.
CPC .............. *G02F 1/39* (2013.01); *G02F 1/3501* (2013.01); *G02F 1/3534* (2013.01); *G02F 1/3544* (2013.01); *G02F 2001/3503* (2013.01); *G02F 2203/13* (2013.01)

(58) Field of Classification Search
CPC .................................................. G02F 2203/13
See application file for complete search history.

(56) References Cited

U.S. PATENT DOCUMENTS

| 5,841,570 | A  | * | 11/1998 | Velsko | ...................... | G02F 1/39 |
|---|---|---|---|---|---|---|
| | | | | | | 359/330 |
| 7,599,409 | B2 | * | 10/2009 | Nishizawa | ............ | G02F 1/3534 |
| | | | | | | 372/20 |
| 8,121,157 | B2 | * | 2/2012 | Maki | ..................... | H01Q 19/062 |
| | | | | | | 372/21 |
| 9,897,893 | B2 | * | 2/2018 | Kawase | ................ | G02F 1/3501 |
| 10,113,959 | B2 | * | 10/2018 | Aiko | ................... | G01N 21/3581 |
| 2007/0160093 | A1 | * | 7/2007 | Nishizawa | ............ | G02F 1/3534 |
| | | | | | | 372/21 |
| 2017/0219911 | A1 | * | 8/2017 | Kawase | ................ | G02F 1/3501 |
| 2018/0031469 | A1 | * | 2/2018 | Aiko | ................... | G01N 21/3581 |
| 2018/0143510 | A1 | * | 5/2018 | Naka | ..................... | G02F 1/3501 |

FOREIGN PATENT DOCUMENTS

JP            3747319 B2     10/2003

* cited by examiner

*Primary Examiner* — Rhonda S Peace
(74) *Attorney, Agent, or Firm* — Flynn Thiel, P.C.

(57) ABSTRACT

A terahertz wave generator 1 includes a nonlinear crystal 4, which is capable of generating a terahertz wave TH, a pumping beam emitter 2, which emits a pumping beam L1, a seed beam emitter 3, which is disposed so as to be parallel to a nonlinear crystal 4 and emits a seed beam L2, a first total reflection mirror 17 and a second total reflection mirror 18, which successively reflect the seed beam L2 emitted from the seed beam emitter 3 to cause the seed beam L2 to be incident on the nonlinear crystal 4, and a convex lens 6, which collects the seed beam L2.

3 Claims, 2 Drawing Sheets

TERAHERTZ WAVE GENERATOR

BACKGROUND OF THE INVENTION

Field of the Invention

The present invention relates to a terahertz wave generator, and more particularly to a terahertz wave generator in which a position where seed beam is incident on a collecting lens is changed to change an angle of incidence of the seed beam on a nonlinear crystal.

Description of the Related Art

Conventionally, a terahertz wave generator has been known. Specifically, there is a known terahertz wave generator including a nonlinear crystal capable of generating a terahertz wave on the basis of a parametric effect, a pumping beam emitter that emits a pumping beam, a seed beam emitter that emits a seed beam, beam guide means for guiding the seed beam emitted from the seed beam emitter to the nonlinear crystal, and a convex lens that is disposed on the optical path of the seed beam and collects the seed beam. In the terahertz wave generator, the pumping beam and the seed beam described above are caused to be incident on the nonlinear crystal at the angle of incidence that satisfies the phase matching condition to cause the nonlinear crystal to generate a terahertz wave (see Japanese Patent No. 3,747,319, for example).

The apparatus described in Japanese Patent No. 3,747,319 has a configuration in which a diffraction grating that diffracts a seed beam and a pair of convex lenses are arranged along a single straight line in the horizontal direction. That is, since a configuration in which the beam guide means and the convex lenses are arranged in a lateral row is employed, a long optical length is required, resulting in a problem of an increase in the size of the apparatus.

SUMMARY OF THE INVENTION

In view of the circumstances described above, the present invention relates to a terahertz wave generator including a nonlinear crystal capable of generating a terahertz wave based on a parametric effect, a pumping beam emitter that emits a pumping beam, a seed beam emitter capable of changing a wavelength of an emitted seed beam, beam guide means for guiding the seed beam emitted from the seed beam emitter to the nonlinear crystal, and a convex lens that is disposed on an optical path of the seed beam and collects the seed beam, and the terahertz wave generator is configured so that the pumping beam and the seed beam are caused to be incident on the nonlinear crystal at an angle of incidence that satisfies a phase matching condition to cause the nonlinear crystal to generate a terahertz wave.

The terahertz wave generator is characterized in that the beam guide means includes a first mirror that reflects the seed beam emitted from the seed beam emitter at a first angle of reflection, a movement mechanism that moves a reflection surface of the first mirror along the optical path of the seed beam emitted from the seed beam emitter is provided, and the first mirror is moved by the movement mechanism in accordance with the wavelength of the seed beam emitted from the seed beam emitter to change a position where the seed beam is incident on the convex lens so that the angle of incidence of the seed beam incident on the nonlinear crystal is changed to satisfy the phase matching condition.

According to the configuration described above, a terahertz wave generator that is more compact and inexpensive than ever can be provided.

DETAILED DESCRIPTION OF THE PREFERRED EMBODIMENTS

Figure 1:
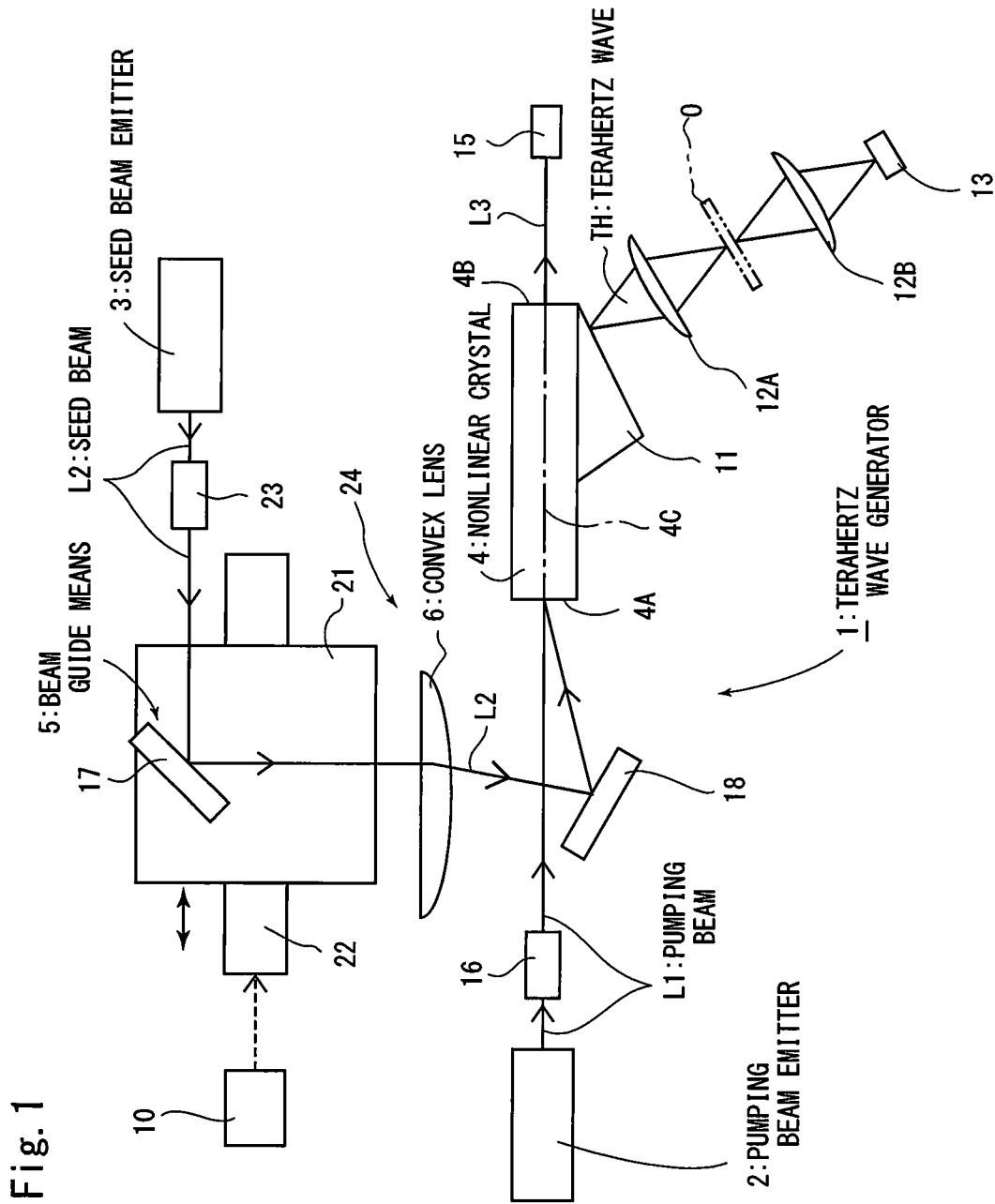
FIG. 1 is a plan view showing the configuration of an embodiment according to the present invention.

The present invention will be described below with reference to the embodiments shown in the drawings. In FIG. 1, reference numeral 1 denotes a terahertz wave generator that generates a terahertz wave TH, and the terahertz wave generator 1 is configured to allow inspection of the quality of an inspection target object O by using the generated terahertz wave TH.

The terahertz wave generator 1 includes a pumping beam emitter 2, which emits a pumping beam L1, a seed beam emitter 3, which emits a seed beam L2, a nonlinear crystal 4, which generates the terahertz wave TH and an idler wave L3 when the seed beam L2 and the pumping beam L1 are caused to be incident on the nonlinear crystal 4 with the seed beam L2 and the pumping beam L1 satisfying the phase matching condition and superimposed on each other, beam guide means 5 for successively reflecting the seed beam L2 emitted from the seed beam emitter 3 to guide the seed beam L2 to the nonlinear crystal 4, and a convex lens 6, which is disposed on the optical path of the seed beam L2 and collects the seed beam L2.

The terahertz wave generator 1 is configured as an injection-seeded type terahertz parametric generator (Is-TPG) in which the seed beam L2 and the pumping beam L1 are caused to be incident on the nonlinear crystal 4 described above with the seed beam L2 and the pumping beam L1 satisfying the phase matching condition and superimposed on each other to cause the nonlinear crystal to generate the idler wave L3 and the terahertz wave TH.

The nonlinear crystal 4 is formed in a rectangular columnar shape, and a holder that is not shown fixes the nonlinear crystal 4 in such a way that the center axis 4C thereof horizontally extends at a predetermined height. A silicon prism 11 is attached to and integrated with a side surface of the nonlinear crystal 4.

A pair of convex lenses 12A and 12B are arranged along the optical path of the terahertz wave TH radiating outward from the nonlinear crystal 4 via the silicon prism 11 with the convex lenses 12A and 12B separate from each other, and a receiver 13 is disposed in an outer position facing the outer convex lens 12B.

At the time of inspection, the inspection target object O is placed in the middle position between the pair of convex lenses 12A and 12B, and when the inspection target object O is irradiated with the terahertz wave TH for inspection, the terahertz wave TH having passed through the inspection target object O is received with the receiver 13. An evaluation apparatus that is not shown evaluates whether or not the quality of the inspection target object O is accepted on the basis of the terahertz wave TH received with the receiver 13.

The pumping beam emitter 2 is horizontally disposed and fixed in a position on the extension from one end of the center axis 4C of the nonlinear crystal 4, and a damper 15 is disposed and fixed in a position on the extension from the other end of the center axis 4C of the nonlinear crystal 4. The pumping beam L1 and the idler wave L3 having passed through the nonlinear crystal 4 and having been radiated outward through an end surface 4B are absorbed by the damper 15.

The pumping beam emitter 2 is formed of a microchip laser, and the operation of the pumping beam emitter 2 is controlled by a controller 10. The pumping beam emitter 2 is horizontally supported so as to be flush with the nonlinear crystal 4 with the pumping beam emitter 2 separate from an end surface 4A of the nonlinear crystal 4.

When the pumping beam emitter 2 is operated, a pulsed laser as the pumping beam L1 is emitted toward the nonlinear crystal 4, and the pumping beam L1 emitted in the form of pulses is caused to be incident at the center of the end surface 4A of the nonlinear crystal 4 (position where center axis 4C of nonlinear crystal 4 intersects end surface 4A). The pulsed laser as the pumping beam L1 has a wavelength of 1064.4 nm, a pulse emission repetition frequency of 100 Hz, and a pulse width of 400 psec. A collimator 16 is disposed on the optical path of the pumping beam L1, and the pumping beam L1 adjusted by the collimator 16 into a collimated beam is caused to be incident on the end surface 4A.

The convex lens 6 is disposed and fixed on one side of the optical path of the pumping beam L1 (left with respect to radiation direction) emitted from the pumping beam emitter 2. The seed beam L2 emitted from the seed beam emitter 3 is collected by the convex lens 6 as a collecting lens and caused to be incident at the center of the end surface 4A of the nonlinear crystal 4 (position where center axis 4C of nonlinear crystal 4 intersects the end surface 4A).

The pumping beam L1 and the seed beam L2 are not necessarily applied to the position where the center axis 4C intersects the end surface 4A and only need to be incident on the end surface 4A with the pumping beam L1 and the seed beam L2 superimposed on each other.

The controller 10 can be a personal computer (PC) or a programmable logic computer (PLC).

The seed beam emitter 3 is horizontally fixed so as to be parallel to the longitudinal direction (center axis 4C) of the nonlinear crystal 4 described above and flush with the nonlinear crystal 4, and the seed beam emitter 3 emits the seed beam L2 in the horizontal direction toward a first total reflection mirror 17, which is disposed in a position upstream of the convex lens 6. That is, in the present embodiment, the optical path of the pumping beam L1 emitted from the pumping beam emitter 2 described above and the optical path of the seed beam L2 immediately after it is emitted from the seed beam emitter 3 are parallel to each other and roughly flush with each other, and the emission direction of the seed beam L2 emitted from the seed beam emitter 3 is opposite to the emission direction of the pumping beam L1 emitted from the pumping beam emitter 2.

The seed beam emitter 3 is formed of a semiconductor laser, and the operation of the seed beam emitter 3 is controlled by the controller 10. When the seed beam emitter 3 is operated, the seed beam L2 is continuously emitted. The optical path of the seed beam L2 immediately after it is emitted is parallel to the center axis 4C of the nonlinear crystal 4 and horizontally extends. In the present embodiment, the laser as the seed beam L2 is emitted from the seed beam emitter 3 so that the wavelength of the laser changes over a range from 1068 to 1075 nm. Changing the wavelength of the seed beam L2 over the range described above allows the emitted terahertz wave TH to have a frequency ranging from 0.8 to 3 THz.

The first total reflection mirror 17 is held by a movable stage 21 and supported so as to incline by 45° with respect to the optical path of the seed beam L2 immediately after it is emitted from the seed beam emitter 3. The seed beam L2 emitted from the seed beam emitter 3 is therefore reflected off the first total reflection mirror 17 at an angle of reflection of 90°. The convex lens 6 described above is disposed on the optical path of the seed beam L2 reflected off the first total reflection mirror 17 by 90° so as to be perpendicular to the optical path.

The movable stage 21, which holds the first total reflection mirror 17, is configured to be movable in the horizontal direction along the optical path of the seed beam L2 immediately after it is emitted from the seed beam emitter 3, and the movable stage 21 is moved by a movement mechanism 22. The operation of the movement mechanism 22 is controlled by the controller 10.

A second total reflection mirror 18 is disposed not only in a position located on the optical path of the seed beam L2 and opposite to the first total reflection mirror 17 with respect to the convex lens 6 but also on the other side of the optical path of the pumping beam L1 (right with respect to radiation direction). The second total reflection mirror 18 is maintained so as to incline by a predetermined angle with respect to the optical path of the seed beam L2 reflected off the first total reflection mirror 17. More specifically, the inclination angle of the second total reflection mirror 18 with respect to the rightward/leftward direction in FIG. 1, which is assumed to be 0°, ranges from about 1 to 2°. The seed beam L2 is therefore caused to be incident on the end surface 4A of the nonlinear crystal 4 at an angle of incidence that satisfies the phase matching condition.

A collimator 23 is disposed on the optical path of the seed beam L2 between the seed beam emitter 3 and the first total reflection mirror 17, and the collimator 23 adjusts the seed beam L2 immediately after it is emitted from the seed beam emitter 3 into a collimated beam.

When the seed beam L2 is emitted from the seed beam emitter 3, the seed beam L2 is adjusted by the collimator 23 into a collimated beam, then reflected off the first total reflection mirror 17 at the angle of reflection of 90°, and guided to the convex lens 6. Thereafter, the seed beam L2 is collected by the convex lens 6, reflected off the second total reflection mirror 18, and then caused to be incident on the end surface 4A of the nonlinear crystal 4. The convex lens 6 in the present embodiment is supported in a predetermined position that allows the focal position of the convex lens 6 to coincide with the position of the end surface 4A of the nonlinear crystal 4 described above.

When the controller 10 causes the movement mechanism 22 to move the movable stage 21 along the optical path of the seed beam L2 by a required amount in the horizontal direction, the position where the seed beam L2 is incident on the convex lens 6 can be changed, whereby the angle of incidence of the seed beam L2 to be incident on the end surface 4A of the nonlinear crystal 4 can be changed.

In the present embodiment, the first total reflection mirror 17 and the second total reflection mirror 18 are each a total reflection mirror that totally reflects a beam, but the mirrors 17 and 18 may instead be a partially transmissive mirror. In this case, the seed beam L2 having passed through the mirrors 17 and 18 may be caused to be incident on an emitter monitor that measures the intensity of the laser.

When the pumping beam L1 and the seed beam L2 are caused to be incident at the center (center axis 4C) of the end surface 4A of the nonlinear crystal 4 with the pumping beam L1 and the seed beam L2 satisfying the phase matching condition and superimposed on each other, the nonlinear crystal 4 generates the terahertz wave TH, which is radiated outward via the prism 11. Further, the idler wave L3 and the pumping beam L1 are radiated outward through the end surface 4B of the nonlinear crystal 4.

As will be understood from the aforementioned description, the beam guide means 5 in the present embodiment is formed of the first total reflection mirror 17 and the second total reflection mirror 18. Further, in the present embodiment, the beam guide means 5, the convex lens 6, and the movement mechanism 22 form seed beam irradiation means 24 for irradiating the end surface 4A of the nonlinear crystal 4 with the seed beam L2.

Further, in the present embodiment, the seed beam irradiation means 24 and the components of the terahertz wave generator 1 described above (pumping beam emitter 2, seed beam emitter 3, and others) are disposed so that the pumping beam L1, the seed beam L2, the idler wave L3, and the terahertz wave TH are present in roughly the same horizontal plane.

As described above, in the present embodiment, the seed beam emitter 3 is disposed so as to be parallel to the longitudinal direction of the nonlinear crystal 4 (center axis 4C) and flush therewith, and the beam guide means 5 guides the seed beam L2 to the single convex lens 6, deflects the seed beam L2 in the direction along the travelling direction of the pumping beam L1, and causes the seed beam L2 to be incident on the end surface 4A of the nonlinear crystal 4. The movement mechanism 22 then causes the movable stage 21 to move the first total reflection mirror 17 in the horizontal direction along the optical path of the seed beam L2 to change the position where the seed beam L2 is incident on the convex lens 6.

In the configuration described above, the terahertz wave TH generated by the terahertz wave generator 1 is used to inspect the inspection target object O as follows:

The inspection target object O is first placed in an inspection position between the pair of convex lenses 12A and 12B.

The controller 10 then causes the movement mechanism 22 to move the first total reflection mirror 17 by a required amount in the horizontal direction in accordance with the wavelength of the terahertz wave TH with which the inspection target object O is irradiated. As a result, the first total reflection mirror 17 is located in a position corresponding to the wavelength of the terahertz wave TH with which the inspection target object O is irradiated.

The controller 10 then activates the pumping beam emitter 2 and the seed beam emitter 3. The pumping beam emitter 2 therefore emits the pumping beam L1 in the form of pulses, and the pumping beam L1 is adjusted by the collimator 16 into a collimated beam and caused to be incident on the end surface 4A of the nonlinear crystal 4. Further, the seed beam emitter 3 emits the seed beam L2 having a wavelength corresponding to the wavelength of the terahertz wave TH applied onto the inspection target object O, and the seed beam L2 is reflected off the first total reflection mirror 17 by 90°, guided to the convex lens 6, collected by the convex lens 6, reflected off the second total reflection mirror 18, and caused to be incident on the end surface 4A of the nonlinear crystal 4.

In this process, since the first total reflection mirror 17 is stationary in the required position according to the wavelength of the seed beam L2 described above, the phase matching condition is satisfied, and the pumping beam L1 and the seed beam L2 are caused to be simultaneously incident on the end surface 4A with the pumping beam L1 and the seed beam L2 superimposed on each other. As a result, the terahertz wave TH is generated, and the idler wave L3 is also generated. The terahertz wave TH is radiated outward via the silicon prism 11 and then applied onto the inspection target object O via the convex lens 12A.

The terahertz wave TH having been applied onto the inspection target object O and having passed therethrough is received with the receiver 13 via the convex lens 12B. The evaluation apparatus that is not shown evaluates whether or not the inspection target object O is accepted on the basis of the terahertz wave TH received with the receiver 13. The idler wave L3 and the pumping beam L1 radiated through the other end surface 4B of the nonlinear crystal 4 are absorbed by the damper 15.

The terahertz wave generator 1 inspects the inspection target object O by using the terahertz wave TH as described above. To change the type of the inspection target object O, however, the wavelength of the terahertz wave TH needs to be changed accordingly.

In this case, the controller 10 instructs the movement mechanism 22 to cause the movable stage 21 to move the first total reflection mirror 17 by a required amount in the horizontal direction along the optical path of the seed beam L2. The first total reflection mirror 17 is thus located in a position where the phase matching condition for obtaining a terahertz wave TH having a predetermined wavelength after the change is satisfied. That is, the position where the seed beam L2 is incident on the convex lens 6 as the collecting lens is changed, so that the angle of incidence of the seed beam L2 incident on the end surface 4A via the second total reflection mirror 18 is changed.

Further, the wavelength of the seed beam L2 emitted from the seed beam emitter 3 is changed to a wavelength for generating the terahertz wave TH having the predetermined wavelength after the change.

As a result, a terahertz wave TH having a wavelength according to the type of the inspection target object O after the change is generated with the phase matching condition is satisfied.

In the present embodiment described above, the convex lens 6 as the collecting lens is disposed only at a single location, and the seed beam L2 is deflected by the beam guide means 5 and incident on the end surface 4A of the nonlinear crystal 4. Therefore, according to the present embodiment, a compact, inexpensive terahertz wave generator 1 can be provided.

Further, the beam guide means 5 includes the first total reflection mirror 17, which is movable in the horizontal direction along the optical path of the seed beam L2, and the second total reflection mirror 18, which is fixed in a predetermined position, and the single convex lens 6 collects the seed beam L2. Therefore, as compared with the apparatus described in Japanese Patent No. 3,747,319, in which an approximate value based on the diffraction grating is used to satisfy the phase matching condition, the present embodiment allows the phase matching condition to be satisfied for any wavelength, whereby the terahertz wave generator 1 can be provided as a wideband, variable wavelength terahertz wave generator having a smaller structure.

In the first embodiment described above, the pumping beam emitter 2 and the seed beam emitter 3 are disposed so that the pumping beam L1 and the seed beam L2 immediately after it is emitted are parallel to each other, but the angle of incidence of the seed beam L2 caused to be incident on the first total reflection mirror 17 can be changed as appropriate. In this case, the angles at which the first total reflection mirror 17 and the second total reflection mirror 18 are supported are adjusted so that the phase matching condition (phase matching angle) is satisfied.

It is noted that the first total reflection mirror 17 described above is not necessarily moved exactly along the optical axis (optical path) of the seed beam L2 immediately after it is emitted from the seed beam emitter 3. That is, the first total reflection mirror 17 may be moved along a path inclining with respect to the optical axis (optical path) of the seed beam L2 as long as the angle of reflection of the seed beam L2 reflected off the first total reflection mirror 17 is fixed. In this case, the position where the seed beam L2 is incident on the first total reflection mirror 17 is shifted when the first total reflection mirror 17 moves along the inclining path.

Figure 2:
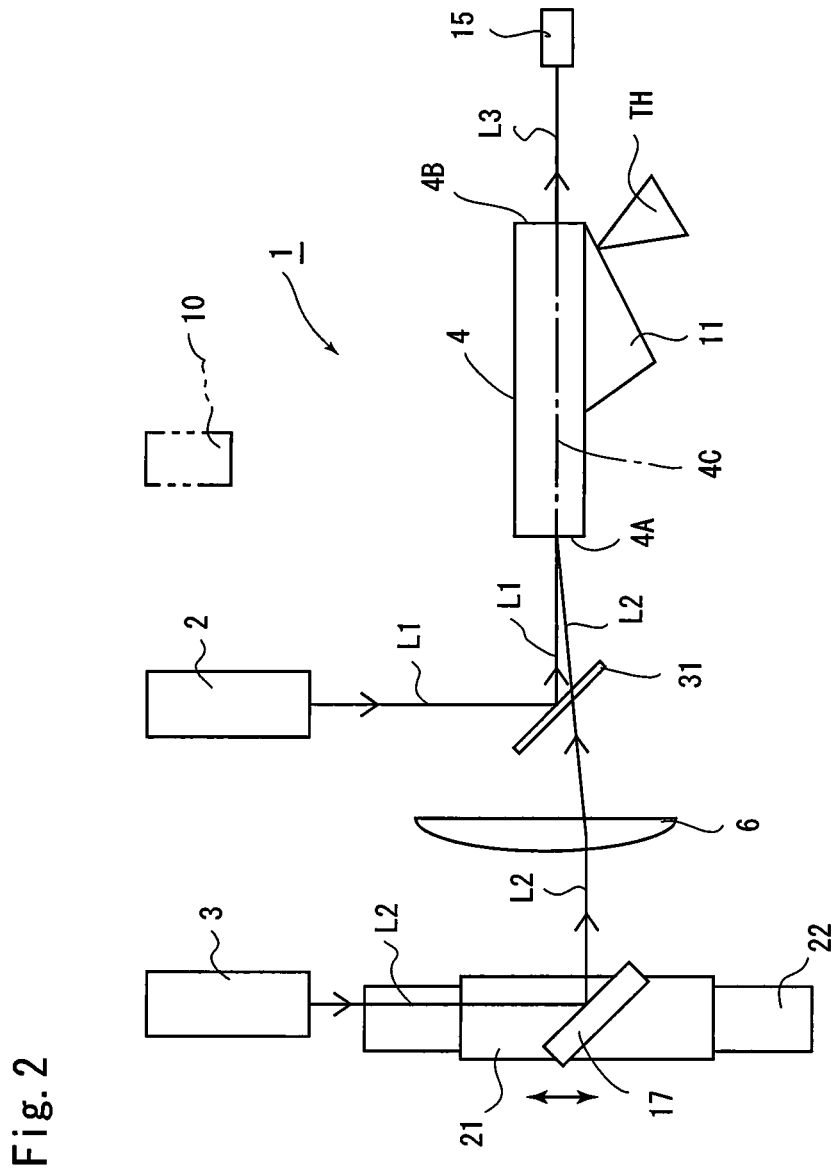
FIG. 2 is a plan view showing the configuration of a second embodiment according to the present invention.

FIG. 2 is a front view showing a second embodiment of the present invention. In the second embodiment, the second total reflection mirror 18 in the first embodiment described above is omitted, and the pumping beam L1 and the seed beam L2 are emitted in the same direction with the pumping beam L1 and the seed beam L2 parallel to each other and then applied onto the nonlinear crystal 4.

That is, the pumping beam emitter 2 and the seed beam emitter 3 are disposed so as to be parallel to each other in the direction perpendicular to the extension from one end of the center axis 4C of the nonlinear crystal 4.

A filter 31 and the convex lens 6 are sequentially arranged on the extension from one end of the center axis 4C of the nonlinear crystal 4. The filter 31 is supported so as to incline by 45° with respect to the optical path of the pumping beam L1 emitted from the pumping beam emitter 2. The filter 31 reflects laser radiation having wavelengths up to 1064.4 nm but transmits laser radiation having wavelengths ranging from 1066 to 1085 nm. That is, the pumping beam L1 (laser) emitted from the pumping beam emitter 2 is reflected off the filter 31, but the seed beam L2 (laser) emitted from the seed beam emitter 3 roughly entirely passes through the filter 31.

Therefore, when the pumping beam emitter 2 emits the pumping beam L1 (laser) having the wavelength of 1064.4 nm, the pumping beam L1 is reflected off the filter 31 by 90° and then caused to be incident on the end surface 4A.

A total reflection mirror 17 is disposed in an outer position opposite the filter 31 with respect to the convex lens 6. The total reflection mirror 17 is held by the movable stage 21, and the movable stage 21 is moved by the movement mechanism 22 in the horizontal direction along the optical path of the seed beam L2 immediately after it is emitted from the seed beam emitter 3 described above. The total reflection mirror 17 is supported by the movable stage 21 with the total reflection mirror 17 inclining by about 45° with respect to the optical path of the seed beam L2 immediately after it is emitted from the seed beam emitter 3.

The seed beam emitter 3 is configured to emit a seed beam L2 (laser) having a wavelength ranging from 1066 to 1085 nm.

When the seed beam L2 is emitted from the seed beam emitter 3, the seed beam L2 is first reflected off the total reflection mirror 17 by 90°, collected by the convex lens 6, then passes through the filter 31 described above from the rear side thereof, and then caused to be incident on the end surface 4A of the nonlinear crystal 4. When the movement mechanism 22 causes the movable stage 21 to move the total reflection mirror 17, the position where the seed beam L2 is incident on the convex lens 6 can be changed, whereby the angle of incidence of the seed beam L2 incident via the convex lens 6 on the end surface 4A can be changed. In the second embodiment, the members corresponding to those in the first embodiment described above have the same member numerals.

Also in the thus configured second embodiment, the pumping beam L1 and the seed beam L2 can be caused to be incident on the end surface 4A of the nonlinear crystal 4 with the pumping beam L1 and the seed beam L2 superimposed on each other to cause the nonlinear crystal to generate the terahertz wave TH. Further, the movement mechanism 22 causes the movable stage 21 to move the total reflection mirror 17 so that the position where the seed beam L2 is incident on the convex lens 6 can be changed, whereby the angle of incidence of the seed beam L2 incident via the convex lens 6 on the end surface 4A can be changed.

The thus configured second embodiment can also provide the same advantageous effects provided by the first embodiment described above.

As the method for inspecting the inspection target object O by using the terahertz wave generator 1, the same inspection target object O may be irradiated with the terahertz wave TH by continuously changing the frequency of the terahertz wave TH from 0.8 to 3 THz. Irradiating the inspection target object O with the wavelength scanned described above allows the inspection of substances characterized in that the wavelengths of the terahertz wave TH that is likely to be absorbed by the substances differ from one another (for example, a case where a substance A is characterized in that it absorbs a terahertz wave of 1 THz and a substance B is characterized in that it absorbs a terahertz wave of 2 THz).

Further, in each of the embodiments described above, one convex lens 6 is disposed on the optical path of the seed beam L2. Instead, a plurality of convex lenses 6 may be disposed on the optical path.

REFERENCE SIGNS LIST

1 Terahertz wave generator
2 Pumping beam emitter
3 Seed beam emitter
4 Nonlinear crystal
5 Beam guide means
6 Convex lens
17 First total reflection mirror
18 Second total reflection mirror
22 Movement mechanism
L1 Pumping beam
L2 Seed beam
TH Terahertz wave

What is claimed is:

1. A terahertz wave generator comprising a nonlinear crystal capable of generating a terahertz wave based on a parametric effect, a pumping beam emitter that emits a pumping beam, a seed beam emitter capable of changing a wavelength of an emitted seed beam, beam guide means for guiding the seed beam emitted from the seed beam emitter to the nonlinear crystal and including a first mirror that reflects the seed beam emitted from the seed beam emitter at a first angle of reflection, a convex lens that is disposed perpendicularly to an optical path of the seed beam reflected by the first mirror and collects the seed beam, a movable stage that is configured to be movable along the optical path of the seed beam incident on the first mirror and supporting the first mirror at a predetermined angle with respect to the optical path of the seed beam, and a movement mechanism for moving a reflection surface of the first mirror along the optical path of the seed beam incident on the first mirror by moving the movable stage, wherein the terahertz wave generator is configured so that the pumping beam and the seed beam are caused to be incident on the nonlinear crystal at an angle of incidence that satisfies a phase matching condition to cause the nonlinear crystal to generate the terahertz wave and the first mirror is simply moved by the movement mechanism in accordance with the wavelength of the seed beam emitted from the seed beam emitter to change a position where the seed beam is incident on the convex lens so that the angle of incidence of the seed beam incident on the nonlinear crystal is changed to satisfy the phase matching condition.

2. The terahertz wave generator according to claim 1, characterized in that the pumping beam emitter and the seed beam emitter are disposed so that the pumping beam emitted from the pumping beam emitter and the seed beam between the seed beam emitter and the first mirror are parallel to each other and a stationary second mirror that reflects the seed beam reflected off the first mirror towards the nonlinear crystal is provided.

3. A terahertz wave generator comprising a nonlinear crystal capable of generating a terahertz wave based on a parametric effect, a pumping beam emitter that emits a pumping beam, a seed beam emitter capable of changing a wavelength of an emitted seed beam, beam guide means for guiding the seed beam emitted from the seed beam emitter to the nonlinear crystal and including a first mirror that reflects the seed beam emitted from the seed beam emitter at a first angle of reflection, a convex lens that is disposed perpendicularly to an optical path of the seed beam reflected by the first mirror and collects the seed beam, a movable stage that is configured to be movable along the optical path of the seed beam incident on the first mirror and supporting the first mirror at a predetermined angle with respect to the optical path of the seed beam, and a movement mechanism for moving a reflection surface of the first mirror along the optical path of the seed beam incident on the first mirror by moving the movable stage, wherein the terahertz wave generator is configured so that the pumping beam and the seed beam are caused to be incident on the nonlinear crystal at an angle of incidence that satisfies a phase matching condition to cause the nonlinear crystal to generate the terahertz wave, the first mirror is simply moved by the movement mechanism in accordance with the wavelength of the seed beam emitted from the seed beam emitter to change a position where the seed beam is incident on the convex lens so that the angle of incidence of the seed beam incident on the nonlinear crystal is changed to satisfy the phase matching condition, the pumping beam emitter and the seed beam emitter are disposed so that the pumping beam emitted from the pumping beam emitter and the seed beam between the seed beam emitter and the first mirror are parallel to each other and a stationary second mirror that reflects the seed beam reflected off the first mirror towards the nonlinear crystal is provided.

* * * * *